United States Patent Office 2,814,556
Patented Nov. 26, 1957

2,814,556

FERTILIZER COMPRISING UREA AND AMMONIUM HYDROGEN PHOSPHATES

Ivan Christoffel, Hopewell, Va., assignor to Allied Chemical & Dye Corporation, New York, N. Y., a corporation of New York No Drawing. Application March 6, 1953,
Serial No. 340,905
15 Claims. (Cl. 71—29)

This invention relates to fertilizers, and more particularly to complete fertilizers, especially liquid complete fertilizers. By complete fertilizers is meant fertilizers which supply nitrogen, phosphorus and potassium; these are the more important elements supplied to soil as plant nutrients.

Most complete fertilizers now available are solids sold in bags and applied to the soil by mechanical spreaders or by hand. Among the objections to solid fertilizers may be mentioned that they tend to cake with consequent spoilage and/or difficulty in removing the solid from the bag, frequently rendering it necessary to regrind the caked product. Another objection is that relatively large amounts of labor and toil are involved in their application to soils.

These and other objections to the handling of solid fertilizers have led in some cases to the use of liquid fertilizers, which, as is well known, can be handled more readily and applied in controlled amounts to the portions of the soil where they are most effective to promote plant growth. However, liquid fertilizers as heretofore produced have had rather low plant food values in order to maintain the effective plant food constituents in solution at low temperatures, as, for example, when the fertilizers are stored in a cold place, e. g., during winter. Moreover, most ammonia type liquid fertilizers heretofore used have had high vapor pressures with consequent loss of ammonia and danger involved in their application. Attempts made to increase the plant food content of ammonia type liquid complete fertilizers have resulted in loss of ammonia or in precipitation of fertilizer constituents.

It is among the objects of this invention to provide a fertilizer having high plant food value including available nitrogen from relatively low cost sources of nitrogen, which fertilizer has a low vapor pressure, low precipitation temperature and good stability during storage.

It is another object of this invention to provide a liquid complete fertilizer having a low vapor pressure, low precipitation temperature and good stability during storage.

Still another object is to provide such complete liquid fertilizer containing nitrogen, phosphorus and potassium in relatively high proportions.

Still another object is to provide a solid fertilizer mixture containing relatively high proportions of available nitrogen and phosphorus with or without potassium, which solid mixture can be dissolved in a relatively small amount of water to produce a liquid fertilizer having a high plant food content, low precipitation temperature, low vapor pressure and good stability during storage.

Other objects and advantages of this invention will be apparent from the following detailed description thereof.

In accordance with this invention the fertilizer comprises as its essential constituents urea and an ammonium phosphate composition equivalent to $$(NH_4)_{(1.4-1.8)}H_{(1.6-1.2)}PO_4$$

From 23% to 81%, preferably from 39% to 70% by weight of such ammonium phosphate composition is mixed with from 19% to 77%, preferably from 30% to 61% by weight of urea. If a fertilizer containing potassium is desired, enough potassium salt is added to produce a fertilizer containing from 7% to 29% $K_2O$. Thus, the fertilizer may contain from 19 to 67 parts of urea, from 11 to 46 parts of potassium salt and from 22 to 70 parts of the ammonium phosphate composition. The above percentage values are on a dry basis.

Dissolution of the dry mixture in a relatively small amount of water produces a solution of high plant food value which will not deposit solid material at temperatures above 0° C. and which has a low vapor pressure. Thus, one part of a mixture containing from 19% to 77% urea and from 23% to 81% ammonium phosphate composition, as hereinabove disclosed, may be dissolved in from 0.9 to 1.2 parts by weight of water. The resulting solution will contain from 10% to 34% urea, from 11% to 42% ammonium phosphate composition and from 48% to 55% water. One part of a mixture containing from 19% to 67% urea, from 22% to 70% ammonium phosphate composition and from 11% to 46% potassium chloride dissolved in from 0.9 to 1.6 parts of water produces a solution containing from 10% to 33% urea, from 11% to 36% ammonium phosphate composition, from 6% to 17% potassium chloride and from 48% to 62% water. This invention includes the solid preparations having constituents mixed in the proportions above indicated, which solid preparations when added to relatively small amounts of water produce liquid fertilizer solutions as well as the resulting aqueous solutions.

It is an important feature of this invention that the ammonium phosphate composition have the $NH_4$, H and $PO_4$ in the mol ratio or equivalent amounts indicated in the above formula. It will be understood that, if the ammonium phosphate composition contains 1.4 equivalents of $NH_4$ it will contain 3 minus 1.4 equivalents of H and one equivalent of $PO_4$. The preferred ammonium phosphate composition contains $NH_4$, H and $PO_4$ in the equivalent ratio of $1.6NH_4:1.4H:1.0PO_4$.

Ammonium phosphate compositions containing from 1.4 to 1.8 equavalents of $NH_4$ may be produced in various ways. Thus, an ammonia water solution may be neutralized with phosphoric acid in amount to produce the desired ammonium phosphate composition having the above noted number of equivalents of $NH_4$. Alternatively, ammonium phosphate may be mixed with diammonium phosphate in proportions to produce a salt containing the desired number of equivalents of $NH_4$. Diammonium phosphate may be mixed with phosphoric acid in proportions to produce such ammonium phosphate compositions. Another method is to react monoammonium phosphate with ammonia in amount to produce such ammonium phosphate composition. Still another method is to start with an ammonium phosphate composition having a number of equivalents of $NH_4$ not within the range of 1.4 to 1.8 and add enough ammonia or phosphoric acid as the case may require to produce an ammonium phosphate composition having from 1.4 to 1.8 equivalents of $NH_4$.

Surprisingly, it has been found that the mixture of urea and ammonium phosphate composition containing from 1.4 to 1.8 equivalents of $NH_4$ is soluble in relatively small amounts of water to produce solutions which do not deposit solid at temperatures above 0° C. The use of such ammonium phosphate compositions for some unexplainable reason makes it possible to dissolve urea in amounts above indicated in relatively small amounts of water to produce solutions having high plant food values. It may be that the relatively high solubility of urea alone or urea along with a potassium salt is due to the dissolution of all or a part thereof into the solution of the ammonium phosphate composition in water. Whatever the explanation may be and it will be understood that the invention is not limited to this explanation, it has been found that by employing the ammonium phosphate compositions above defined along with urea and with or without potassium salts in the proportions above described, fertilizers result which can be dissolved in relatively small amounts of water to produce solutions which will not deposit solids at temperatures above 0° C., have low vapor pressure and good stability during storage. Liquid fertilizers coming within the scope of this invention contain at least 20%, preferably from 27% to 35%, total plant food of which when no potassium is present the $P_2O_5$ content is at least 6% and preferably from 11% to 24%, the nitrogen content is at least 12%, preferably from 14% to 17%; and when potassium is present the nitrogen content is at least 6.5%, preferably from 10% to 17%, the $K_2O$ content is at least 3.5% and preferably from 5% to 9%, and the $P_2O_5$ content is at least 6% and preferably from 7% to 19%. The amount of water in such solutions is from 48% to 62% by weight.

The solid fertilizer mixture, i. e., the preparation made for dissolution in water, has a total nitrogen content of from 24% to 40% when no potassium is present and from 17% to 35% when potassium is present, a $P_2O_5$ content of at least 12% and preferably from 14% to 46%, and a potassium content, if present, of at least 7% and preferably from 10% to 21% of $K_2O$.

As the potassium salt, if used, potassium chloride is preferred although potassium nitrate or potassium sulfate may be used.

Instead of some of the urea over and above 10% by weight based on the weight of the liquid solution, ammonium nitrate, ammonium sulfate or ammonium sulfite may be used. Thus, the available nitrogen in the fertilizer is derived from the ammonium phosphate composition, also from the urea, and, if desired, also from ammonia containing salts thus incorporated in the mixture. When such nitrogen carrier is employed, the ammonium salt preferably is added in amount not exceeding 20% by weight of the dry mixture.

The order in which the constituents are mixed and the temperature at which the mixing is carried out are not critical provided the temperatures employed are below the decomposition temperatures of the constituents of the mix. When incorporating urea in the mixture, temperatures above 100° C., in general, should be avoided to minimize decomposition. Preferably the constituents are mixed at room temperature. As the reaction between the phosphoric acid and the ammonia is exothermic, care should be taken to avoid excessively high temperatures during this reaction; for example, the reaction mixture may be cooled to maintain it below 100° C.

In a preferred embodiment of the invention, phosphoric acid at room temperature is mixed with liquid or gaseous ammonia and the reaction mixture is cooled, if necessary, to maintain it within the range of 80° to 90° C. Potassium salt is then dissolved in the warm reaction mixture; the heat liberated during the reaction thus facilitates the dissolution of the potassium salt. Thereafter the resulting solution is filtered to remove any solid impurities which may be present and the filtrate mixed with the urea solution. In this way a clear solution is produced at a temperature of about 50° C. which requires no extraneous cooling as by the use of cooling water. Furthermore, operating in this manner eliminates the necessity of filtering the urea solution along with the ammonium phosphate composition containing potassium chloride, with consequent saving in the size of the filtration apparatus. As the urea solution is not mixed with ammonium phosphate composition containing dissolved potassium salt until the latter is at a temperature below the reaction temperature prevailing during the reaction of ammonia and phosphoric acid, decomposition of the urea is minimized, if not completely prevented.

The following examples of the invention are given for the purposes of illustration only; it will be understood the invention is not limited to these examples. In these examples all parts are by weight. All percentages are by weight based on total composition.

EXAMPLE I—CONTAINS $(NH_4)_{1.6}H_{1.4}PO_4$ 252 parts of urea are dissolved in 496.4 parts of water containing 27 parts of ammonia. To this solution is added 113 parts of commercial potassium chloride (62% $K_2O$). The solution is warmed to 25° C. and 113.6 parts of 85% phosphoric acid (70 parts $P_2O_5$ and 43.6 parts water) are added over a period of 10 minutes while the solution temperature is maintained at between 25° to 30° C. The heat liberated during the addition of the phosphoric acid is dissipated by cooling water. A small amount of a red insoluble precipitate derived from the potassium chloride is filtered off. The resulting filtrate does not deposit any solid material at temperatures above 0° C. It contains approximately 12.5% $(NH_4)_{1.6}H_{1.4}PO_4$, 25.2% urea, 51% water, 11.3% KCl; expressed in the more conventional terms of nitrogen, $P_2O_5$ and $K_2O$, it contains 14%, 7% and 7%, respectively, of these plant nutrients.

EXAMPLE II—CONTAINS $(NH_4)_{1.6}H_{1.4}PO_4$

Water (488 parts), ammonia (54 parts) and 85% phosphoric acid (228 parts) are fed to a neutralizer. Either by controlling the rate of feed or by external cooling, the temperature of the reaction mixture is maintained within the range of 80° to 90° C. 227 parts of potassium chloride are added and the mixture agitated until complete dissolution occurs; the heat liberated during neutralization thus facilitates dissolution of the salt. The resulting solution is filtered to remove any solid impurities which may be present, and to the filtrate are added 1008 parts of an aqueous solution containing 50 wt. percent urea. A clear solution (2000 parts) is produced containing approximately 12.5%

$(NH_4)_{1.6}H_{1.4}PO_4$ 11.3% KCl, 51% $H_2O$ and 25.2% urea. This solution contains 14% N, 7% $P_2O_5$ and 7% $K_2O$, and does not deposit solid material at temperatures above 0° C.

EXAMPLE III—CONTAINS $(NH_4)_{1.6}H_{1.4}PO_4$

A solution is prepared by adding to 432 parts of 3.9 N ammonium hydroxide, 362 parts of monoammonium phosphate, 928 parts of water, 371 parts of urea and 322 parts of potassium chloride. The solution thus produced contains 16.3% $(NH_4)_{1.6}H_{1.4}PO_4$, 15.4% urea, 13.3% potassium chloride and 55% water. It contains 10% nitrogen, 9% $P_2O_5$ and 8.4% $K_2O$. It does not deposit solid at temperatures above 0° C.

EXAMPLE IV—CONTAINS $(NH_4)_{1.6}H_{1.4}PO_4$ 6.3 parts of an ammonium phosphate composition containing 1.6 equivalents $NH_4$, 1.4 equivalents H and 1.0 equivalents of $PO_4$ are added to an aqueous solution of urea containing 9.1 parts of water and 4 parts of urea. A solution results containing 32.5% ammonium phosphate composition, 20.6% urea and the balance water. This solution contains 15.4% nitrogen and 18.1% $P_2O_5$, of this nitrogen 5.8% is derived from the ammonium phosphate composition and the balance from the urea. It does not deposit solid material at temperatures above 0° C.

EXAMPLE V—CONTAINS $(NH_4)_{1.8}H_{1.2}PO_4$

To a solution of 3.9 parts ammonia in 47.3 parts water is added 14.6 parts of 85% phosphoric acid, 21.5 parts urea and 12.7 parts KCl. 100 parts of a liquid complete fertilizer is produced containing 16.3% $(NH_4)_{1.8}H_{1.2}PO_4$, 12.7% potassium chloride, 49.5% water and 21.5% urea. This solution contains 13.2% N, 9.0% $P_2O_5$ and 8% $K_2O$ and does not deposit solid material at temperatures above 0° C.

EXAMPLE VI—CONTAINS $(NH_4)_{1.4}H_{1.6}PO_4$

To a solution of 2.3 parts $NH_3$ in 54.4 parts water is added 11.4 parts of 85% phosphoric acid, 7.9 parts potassium chloride and 24.0 parts urea. 100 parts of a liquid complete fertilizer are produced containing 12% $(NH_4)_{1.4}H_{1.6}PO_4$, 7.9% potassium chloride, 56.1% water and 24% urea. This solution contains 13.1% N, 7.0% $P_2O_5$ and 5% $K_2O$ and does not deposit solid material at temperatures above 0° C.

EXAMPLE VII—CONTAINS $(NH_4)_{1.6}H_{1.4}PO_4$ AND NITROGEN CARRIER (AMMONIUM SULFITE) IN ADDITION TO UREA AND POTASSIUM SALT

Monoammonium phosphate (15.3 parts) was mixed with 26.2 parts of diammonium phosphate, 27.6 parts urea, 24 parts KCl and 6.9 parts of ammonium sulfite giving 100 parts of solid fertilizer mixture. Then 100 parts of this solid preparation were dissolved in 176 parts water to give 276 parts of solution containing 8% N, 8.5% $P_2O_5$ and 5.5% $K_2O$. The ammonium phosphate composition of this solution was 15%

$$(NH_4)_{1.6}H_{1.4}PO_4$$

This solution did not deposit solid on standing at 0° C.

EXAMPLE VIII—CONTAINS $(NH_4)_{1.6}H_{1.4}PO_4$ AND NITROGEN CARRIER (AMMONIUM SULFATE) IN ADDITION TO UREA AND POTASSIUM SALT

Monoammonium phosphate (16.9 parts) was mixed with 29.1 parts diammonium phosphate, 18.0 parts potassium chloride, 30.6 parts urea and 5.5 parts ammonium sulfate giving 100 parts of a solid fertilizer mixture. Then 100 parts of this solid preparation were dissolved in 206 parts water to give 306 parts of a solution containing 7.7% N, 8.5% $P_2O_5$ and 3.7% $K_2O$. The ammonium phosphate composition of this solution was 15% $(NH_4)_{1.6}H_{1.4}PO_4$. This solution did not deposit solid on standing at 0° C.

EXAMPLE IX—CONTAINS $(NH_4)_{1.6}H_{1.4}PO_4$ AND NITROGEN CARRIER (AMMONIUM NITRATE) IN ADDITION TO UREA AND POTASSIUM SALT

Monoammonium phosphate (14.9 parts) was mixed with 25.8 parts diammonium phosphate, 18.4 parts potassium chloride, 27.1 parts urea, and 13.8 parts ammonium nitrate giving 100 parts of solid fertilizer mixture. 100 parts of this solid preparation were dissolved in 171 parts water to give a solution containing 40.7 parts ammonium phosphate of the composition $(NH_4)_{1.6}H_{1.4}PO_4$ and 9.1% N, 8.5% $P_2O_5$ and 4.3% $K_2O$. This solution did not deposit solid on standing at 0° C.

EXAMPLE X—CONTAINS $(NH_4)_{1.6}H_{1.4}PO_4$ AND NITROGEN CARRIER (AMMONIUM NITRATE) IN ADDITION TO UREA

Monoammonium phosphate (14.9 parts) was mixed with 25.6 parts diammonium phosphate, 39.5 parts ammonium nitrate and 20.0 parts urea giving 100 parts of solid fertilizer mixture. 100 parts of this solid preparation were dissolved in 100 parts of water to give a solution containing 20.3% ammonium phosphate of the composition $(NH_4)_{1.6}H_{1.4}PO_4$, 11.5% $P_2O_5$ and 15.2% nitrogen. This solution did not deposit solid on standing at 0° C.

All of the above examples result in fertilizer solutions which have a low vapor pressure, do not deposit solid material at temperatures above 0° C. and have good stability during storage. The vapor pressure of the solutions is so low that no noticeable odor of ammonia is present when the solution is at room temperature (20°–25° C.). Thus, for example, the vapor pressure of the solution of Example II which contains 25.2% urea is given in the table which follows. For purposes of comparison there is given in this table the vapor pressure of urea-ammonia-water solutions, wherein virtually all the pressure is caused by the volatility of the contained ammonia. It will be noted the vapor pressure of the liquid complete fertilizer of Example II is far lower because the ammonia volatility is negligible and the water provides essentially all of the vapor pressure.

Table

VAPOR PRESSURE LIQUID COMPLETE FERTILIZER OF EXAMPLE II

| Temperature, °C. | Total Vapor Pressure, lb./sq. in. absolute |
| --- | --- |
| 35 | 0.9 |
| 40 | 1.1 |
| 45 | 1.4 |

VAPOR PRESSURE UREA-AMMONIA-WATER SOLUTIONS

| Urea Weight Percent | Weight Ratio, $NH_3$ to ($NH_3$ and $H_2O$) | Total Vapor Pressure, lb./sq. in. absolute at 40° C. |
| --- | --- | --- |
| 14.2 | 0.75 | 153 |
| 35.0 | 0.65 | 108 |

The substitution of other ammonium phosphate compositions for those produced or employed in the above examples, which other ammonium phosphate compositions have from 1.4 to 1.8 equivalents of $NH_4$, 3 minus the number of equivalents of $NH_4$, equivalents of H, and 1.0 equivalent of $PO_4$, produce fertilizers having substantially the same desirable properties.

While the above examples are illustrative of liquid fertilizer solutions embodying this invention, it will be understood that the invention includes dry or solid mixtures in which the constituents are present in the proportions hereinabove indicated, except that the water has been omitted. Such preparations may be stored and transported in dry or solid form, thus saving the cost of transporting the water. When it is desired to apply the fertilizers, the dry or solid preparation is dissolved in a relatively small amount of water to produce liquid solutions having the desirable properties hereinabove noted.

It will be noted that in Examples VII, VIII, IX and X solid fertilizer mixtures embodying this invention are first prepared and these solid mixtures are dissolved in water to produce liquid fertilizers. Another example of the production of a solid fertilizer mixture in accordance with this invention is as follows:

EXAMPLE XI—SOLID COMPLETE FERTILIZER

Ammonia gas (5.4 parts) is passed into 32.3 parts of 60% phosphoric acid. The considerable heat evolved raises the temperature of the mixture to about 100° C. Upon cooling, the mixture solidifies; it is dried, crushed and screened for size. The resulting mixture of mono- and diammonium salts, is blended with 22.7 parts of potassium chloride and 50.4 parts of crystal urea. Thus, a mixture of about 100 parts of solid is produced containing about 2% moisture, and which, when dissolved in approximately 100 parts of water, will produce a liquid complete fertilizer containing about 14% nitrogen, 7%

$P_2O_5$ and 7% $K_2O$. This solution will remain clear at temperatures above 0° C.

It will be noted this invention provides a fertilizer having high plant food value including available nitrogen from relatively low cost sources of nitrogen, such as ammonia and urea, which fertilizer has low vapor pressure, low precipitation temperature and good stability during storage. Furthermore, this invention provides liquid complete fertilizers having low vapor pressure, low precipitation temperature, good stability during storage and containing nitrogen, phosphorus and potassium in relatively high proportions. An important feature of this invention is that such solutions remain stable at temperatures above 0° C., i. e., will not deposit solid material at temperatures above 0° C. and this even though the solution contains a maximum of 62% water.

All percentages and parts in the claims are on a weight basis.

Since certain changes in carrying out the process, and certain modifications in the fertilizer which embody the invention may be made without departing from its scope, it is intended that all matter contained in the above description shall be interpreted as illustrative and not in a limiting sense.

What is claimed is:

1. A fertilizer comprising from 19% to 77% of urea and from 23% to 81% of an ammonium phosphate composition equivalent to $$(NH_4)_{(1.4-1.8)}H_{(1.6-1.2)}PO_4$$

said fertilizer being soluble in water to produce a solution containing at least 45 parts of said urea and said ammonium phosphate composition per 55 parts of water, which solution will not salt out at 0° C.

2. A fertilizer comprising from 19% to 77% of urea and from 23% to 81% of an ammonium phosphate composition equivalent to $$(NH_4)_{(1.6-1.8)}H_{(1.4-1.2)}PO_4$$

said fertilizer being soluble in water to produce a solution containing at least 45 parts of said urea and said ammonium phosphate composition per 55 parts of water, which solution will not salt out at 0° C.

3. A fertilizer comprising from 19% to 77% of urea and from 23% to 81% of an ammonium phosphate composition equivalent to $$(NH_4)_{1.6}H_{1.4}PO_4$$

said fertilizer being soluble in water to produce a solution containing at least 45 parts of said urea and said ammonium phosphate composition per 55 parts of water, which solution will not salt out at 0° C.

4. A fertilizer comprising as its essential constituents from 19% to 67% of urea, from 11% to 46% of a potassium salt from the group consisting of potassium chloride, potassium nitrate and potassium sulfate, and from 22% to 70% of an ammonium phosphate composition equivalent to $$(NH_4)_{(1.4-1.8)}H_{(1.6-1.2)}PO_4$$

said fertilizer being soluble in water to produce a solution containing at least 45 parts of said urea, said potassium salt and said ammonium phosphate composition per 55 parts of water, which solution will not salt out at 0° C.

5. A fertilizer comprising as its essential constituents from 19% to 67% of urea, from 11% to 46% of a potassium salt from the group consisting of potassium chloride, potassium nitrate and potassium sulfate, and from 22% to 70% of an ammonium phosphate composition equivalent to $$(NH_4)_{(1.6-1.8)}H_{(1.4-1.2)}PO_4$$

said fertilizer being soluble in water to produce a solution containing at least 45 parts of said urea, said potassium salt and said ammonium phosphate composition per 55 parts of water, which solution will not salt out at 0° C.

6. A fertilizer comprising as its essential constituents from 19% to 67% of urea, from 11% to 46% of a potassium salt from the group consisting of potassium chloride, potassium nitrate and potassium sulfate, and from 22% to 70% of an ammonium phosphate composition equivalent to $$(NH_4)_{1.6}H_{1.4}PO_4$$

said fertilizer being soluble in water to produce a solution containing at least 45 parts of said urea, said potassium salt and said ammonium phosphate composition per 55 parts of water, which solution will not salt out at 0° C.

7. A liquid fertilizer solution which will not deposit solid material at 0° C., containing at least 45% of solute dissolved in water, said solution containing as said solute from 10% to 34% of urea, and from 11% to 42% of an ammonium phosphate composition equivalent to $$(NH_4)_{(1.4-1.8)}H_{(1.6-1.2)}PO_4$$

8. A liquid fertilizer solution which will not deposit solid material at 0° C., containing at least 45% of solute and from 48% to 55% of water, said solution containing as said solute from 10% to 34% of urea and from 11% to 42% of an ammonium phosphate composition equivalent to $$(NH_4)_{(1.6-1.8)}H_{(1.4-1.2)}PO_4$$

9. A liquid fertilizer solution which will not deposit solid material at 0° C., containing at least 45% of solute and from 48% to 55% of water, said solution containing as said solute from 10% to 34% of urea and from 11% to 42% of an ammonium phosphate composition equivalent to $$(NH_4)_{1.6}H_{1.4}PO_4$$

10. A liquid fertilizer solution which will not deposit solid material at 0° C., containing at least 45 parts of solute per 100 parts of solution, the solvent in said solution being water and the solution containing as said solute from 10% to 33% of urea, from 6% to 17% of a potassium salt from the group consisting of potassium chloride, potassium nitrate and potassium sulfate, and from 11% to 36% of an ammonium phosphate composition equivalent to $$(NH_4)_{(1.4-1.8)}H_{(1.6-1.2)}PO_4$$

11. A liquid fertilizer solution which will not deposit solid material at 0° C., containing at least 45 parts of solute per 100 parts of solution, the solvent in said solution being water and the solution containing as said solute from 10% to 33% of urea, from 6% to 17% of a potassium salt from the group consisting of potassium chloride, potassium nitrate and potassium sulfate, and from 11% to 36% of an ammonium phosphate composition equivalent to $$(NH_4)_{(1.6-1.8)}H_{(1.4-1.2)}PO_4$$

12. A liquid fertilizer solution which will not deposit solid material at 0° C., containing at least 45 parts of solute per 100 parts of solution, the solvent in said solution being water and the solution containing as said solute from 10% to 33% of urea, from 6% to 17% of a potassium salt from the group consisting of potassium chloride, potassium nitrate and potassium sulfate, and from 11% to 36% of an ammonium phosphate composition equivalent to $$(NH_4)_{1.6}H_{1.4}PO_4$$

13. A process of producing a liquid fertilizer which comprises mixing ammonia, water and phosphoric acid, the ammonia and phosphoric acid being present in proportions to produce an ammonium phosphate composition equivalent to $$(NH_4)_{(1.4-1.8)}H_{(1.6-1.2)}PO_4$$

dissolving a potassium salt from the group consisting of potassium chloride, potassium nitrate and potassium sulfate in the resulting solution, utilizing the heat liberated in the reaction between the ammonia and phosphoric acid to facilitate dissolution of the potassium salt, and adding to the resultant solution an aqueous solution of urea, the constituents being incorporated in an amount to produce a solution containing at least 45% of said ammonium phosphate composition, said potassium salt and said urea, which solution will not salt out at 0° C., the solution containing from 10% to 33% of urea, from 6% to 17% of said potassium salt, from 11% to 36% of said ammonium phosphate composition and from 48% to 62% of water.

14. A process of producing a liquid fertilizer which comprises mixing ammonia, water and phosphoric acid, the ammonia and phosphoric acid being present in proportions to produce an ammonium phosphate composition equivalent to $$(NH_4)_{(1.6-1.8)}H_{(1.4-1.2)}PO_4$$

dissolving a potassium salt from the group consisting of potassium chloride, potassium nitrate and potassium sulfate in the resulting solution, utilizing the heat liberated in the reaction between the ammonia and phosphoric acid to facilitate dissolution of the potassium salt, and adding to the resultant water solution an aqueous solution of urea, the constituents being incorporated in an amount to produce a solution containing at least 45% of said ammonium phosphate composition, said potassium salt and said urea, which solution will not salt out at 0° C., said solution containing from 10% to 33% of urea, from 6% to 17% of said potassium salt, from 11% to 36% of said ammonium phosphate composition and from 48% to 62% of water.

15. A process of producing a liquid fertilizer which comprises mixing ammonia, water and phosphoric acid, the ammonia and phosphoric acid being present in proportions to produce an ammonium phosphate composition equivalent to $$(NH_4)_{1.6}H_{1.4}PO_4$$

dissolving a potassium salt from the group consisting of potassium chloride, potassium nitrate and potassium sulfate in the resulting solution, utilizing the heat liberated in the reaction between the ammonia and phosphoric acid to facilitate dissolution of the potassium salt and adding to the resultant solution an aqueous solution of urea, the constituents being incorporated in an amount to produce a solution containing at least 45% of said ammonium phosphate composition, said potassium salt and said urea, which solution will not salt out at 0° C., said solution containing from 10% to 33% of urea, from 6% to 17% of said potassium salt, from 11% to 36% of said ammonium phosphate composition and from 48% to 62% of water.

References Cited in the file of this patent

UNITED STATES PATENTS

| | | |
|---|---|---|
| 1,264,513 | Hechenbleikner | Apr. 30, 1918 |
| 1,355,369 | Washburn | Oct. 12, 1920 |
| 1,699,254 | Schwartz | Jan. 15, 1929 |
| 1,834,418 | Pevere | Dec. 1, 1931 |
| 1,950,068 | Spangenberg | Mar. 6, 1934 |
| 1,966,820 | Jones | July 17, 1934 |
| 2,022,674 | Kniskern | Dec. 3, 1935 |
| 2,022,676 | Kniskern | Dec. 3, 1935 |

FOREIGN PATENTS

| | | |
|---|---|---|
| 302,148 | Great Britain | Aug. 15, 1929 |
| 318,909 | Great Britain | Sept. 10, 1929 |
| 396,092 | Great Britain | July 27, 1933 |

OTHER REFERENCES

"International Critical Tables of Numerical Data Physics, Chemistry, and Technology," by National Research Council of U. S. A. Published by McGraw-Hill Books, Inc., New York, 1928, vol. 4; pages 216, 218, 239, 240, 250, 251.